UNITED STATES PATENT OFFICE.

HARRISON W. COTTLE, OF LYNN, MASSACHUSETTS.

IMPROVEMENT IN BLEACHING BUFFED SOLE-LEATHER.

Specification forming part of Letters Patent No. 135,632, dated February 11, 1873.

*To all whom it may concern:*

Be it known that I, HARRISON W. COTTLE, of Lynn, of the county of Essex and State of Massachusetts, have made a new and useful invention having reference to the Bleaching or Coloring of Sole-Leather; and do hereby declare the same to be described as follows:

In preparing sole-leather for being bleached, colored, or treated by the new and useful composition hereinafter explained, such leather is first to be "buffed," an operation well known to shoemakers—that is, it is to be ground down by a buffing-wheel, so as to remove the hard, red, outer covering or surface—after which the composition or preparation is to be laid on such buffed surface by means of a sponge, brush, or other suitable device.

The said composition is a useful agent for bleaching or coloring boot or shoe soles, sole-leather, or belting-leather, as it will change the color of hemlock or oak tanned leather to a lighter buff color, giving it a color very nearly approaching white.

I have discovered that sulphurous acid when properly employed, and especially when combined with other ingredients, as hereinafter described, will so decolor or bleach buffed sole-leather without injuring it. The sulphurous acid when used for the purpose may be combined with a base like soda, or be employed by itself in liquid or vapor.

I prefer, however, to make a composition as follows—that is, I take strong saturated solution of hyposulphite of soda in pure water, and filter it in order to remove from it any insoluble matter or sediment. Of this solution I take one part, by measure, and mix it thoroughly with one part, by measure, of the strongest commercial solution of sulphurous acid, and one part, by measure, of strong alcohol. After agitating the ingredients together I allow the preparation to stand a short time, after which it will be ready for use; its application to buffed leather being as hereinbefore explained.

I do not confine my composition to the precise proportions as stated for its ingredients. The hyposulphite of soda may be used with other acids, as sulphuric or muriatic acids, which, by eliminating sulphurous acid, will produce the necessary effect.

The buffing of the sole-leather or tanned skin forms an important feature of my process, as without the leather being first buffed the composition laid upon the surface will not produce the desired effect.

I claim therefore as my invention—

1. The above-described means or process of treating sole-leather, the same consisting in buffing the tanned skin or sole-leather, and subsequently applying to the buffed surface thereof sulphurous acid, or the composition as described, in which such constitutes a material part.

2. The above-described composition for application to buffed tanned skins or sole-leather, as and for the purpose specified.

HARRISON W. COTTLE.

Witnesses:
    R. H. EDDY,
    J. R. SNOW.